United States Patent [19]

Shoji et al.

[11] Patent Number: 4,744,225
[45] Date of Patent: May 17, 1988

[54] CONTAINERS FOR TRANSPORTING PERISHABLE FOODS

[75] Inventors: Koichiro Shoji, Kamakura; Isamu Yuki, Tokyo; Saburo Ozeni, Kanagawa; Kinya Niizeki, Tokyo; Kenyo Matsushita; Keiichi Akashi, both of Shizuoka, all of Japan

[73] Assignees: Nippon Yusen Kaisha; Nippon Light Metal Co., Ltd., both of Tokyo, Japan

[21] Appl. No.: 921,192

[22] Filed: Oct. 21, 1986

[51] Int. Cl.$^4$ .............................................. B60H 3/04
[52] U.S. Cl. ........................................ 62/239; 62/407
[58] Field of Search ........................ 62/239, 237, 407

[56] References Cited

U.S. PATENT DOCUMENTS

| | | | |
|---|---|---|---|
| 3,246,592 | 4/1966 | Rath | 62/239 |
| 3,362,179 | 1/1968 | Kirkpatrick | 62/239 |
| 3,421,336 | 1/1969 | Lichtenberger et al. | 62/239 |
| 3,453,839 | 7/1969 | Sabin | 62/239 |
| 3,699,870 | 10/1972 | Cantagallo et al. | 62/239 |

*Primary Examiner*—Ronald C. Capossela
*Attorney, Agent, or Firm*—Cushman, Darby & Cushman

[57] ABSTRACT

The container for use in the transporation of fresh provisions comprises a storage chamber for containing perishable foods and a machine room divided from each other by partition walls, main cold air flow channels opened at one end on the side of a door and auxiliary cold air flow channels closed at the other end on the side of the door, both of which are respectively disposed to the surface of the bottom wall, top wall or one side wall of the storage chamber, apparatus for blowing cold airs having ports perforated substantially over the entire region at the surface of the auxiliary cold air flow channels on the side of the storage chamber, apparatus disposed within the machine room for controlling the temperature of the recycled cold airs from the storage chamber and then supplying them by way of the main cold air flow channels to the inside of the storage chamber, and apparatus disopsed within the machine room for pressurizing the circulated cold airs from the storage chamber and then feeding them by way of the auxiliary cold air flow channels to the inside of the storage chamber.

9 Claims, 5 Drawing Sheets

CONTAINERS FOR TRANSPORTING PERISHABLE FOODS

BACKGROUND OF THE INVENTION

1. Field of the Invention

This invention concerns a container for use in the transportation of perishable foods that can transport perishable foods such as vegetables, fruits or fishes and meats without degrading their freshness.

2. Description of the Prior Art

For maintaining the freshness of perishable foods, it is generally required to preserve the perishable foods at optimal low temperature conditions depending on the type of foods. For instance, in the case of tables and fruits, it is required to store them under low temperature conditions i.e., within a range of temperature that is not so low as to cause low temperature injury. In the case of those fishes and meats, the taste of which will change upon freezing, low temperature conditions within such a range of temperature so as not to cause freezing are required and, further, in the case of those fishes and meats which are freezable, low temperature conditions corresponding thereto are required.

For transporting such perishable foods, containers have been employed that transport perishable foods while keeping them under adequate temperature conditions by circulating cold along the inner wall surfaces of the chamber with an aim of keeping them cool and fresh during transportation.

However, since the perishable foods contained in the storage chamber are merely cooled by the cold air circulated along the inner wall surface of the storage chamber in such conventional transportation containers, if an optimum low temperature condition can be maintained by the sufficient cooling at a region near the inner wall surface, the cooling effect of the cold air is reduced as it travels through the inner wall surface and approaches the central portion of the storage chamber. This results in a temperature slope of several °C. or greater over the range from the vicinity of the inner wall surface to the central region of the storage chamber. Then, the freshness of the perishable foods stored at the central region is reduced, particularly, in the case of vegetables and fruits that dissipate heat during transportation due to aspiration or after-ripening effect. If the power of a cooler, etc. is increased for compensating such reduction in the cooling effect, it will inevitably increase the final cost of the perishable foods, and may chill the food stored near end surfaces of the wall.

In view of the above, the present inventors have already proposed a container for the transportation of perishable foods which comprises, in addition to main recycling cold air flows circulated within the storage chamber, auxiliary recycling cold air flows circulated substantially perpendicular to the direction of the main recycling cold air flows (Japanese Patent Laid-Open Publication No. 177687/1982).

The transportation container proposed by the present inventors can overcome the various problems in the conventional transportation containers as described above and has actually attained certain satisfactory results. However, it requires gaps to be formed through which the auxiliary recycling cold air flows are passed on each of lateral side wall surfaces, in addition to the gaps through which the main recycling cold air flows are passed on each of the upper and lower as well as front and back wall surfaces. This reduces the effective containing capacity of the storage chamber by so much and, further, requires fences and like other equipments to each of the side wall surfaces for preventing the cargoes from breaking loose and gap maintaining means for advancing or retracting the fences, etc. This results in a further additional problem of increased cost in the transportation and of troublesome loading works.

OBJECT OF THE INVENTION

The object of this invention is to provide a container for use in the transportation of perishable foods in which the temperature in the storage chamber can be made uniform, thereby preventing the degradation of the freshness in the case where the cargoes are perishable foods other than those vegetables and fruits that discharge after-ripening ingredients such as ethylene or aldehydes, or in which the temperature in the storage chamber can be made uniform and the ventilation for the after-ripening ingredients can be promoted thereby preventing the degradation of the freshness in the case where the cargoes are vegetables and fruits that discharge the after-ripening ingredients, as well as in which the effective containing capacity of the storage chamber can be improved and the power-saving can be attained in the loading works for any kind of the cargoes.

Another object of this invention is to provide a container for use in the transportation of perishable foods capable of unifying the temperature in the storage chamber with a simple structure.

A further object of this invention is to provide a container for use in the transportation of perishable foods capable of reducing the concentration of after-ripening ingredients in the cold airs.

SUMMARY OF THE INVENTION

The foregoing objects of this invention can be attained by a container for use in the transportation of perishable foods comprising:

a storage chamber for containing perishable foods and a machine chamber divided from each other by partition walls;

main cold air flow channels opened at one end on the side of a door and auxiliary cold air flow channels closed at the end on the side of the door, which are respectively disposed to one of the bottom wall, top wall or side wall of the storage chamber;

means for blowing cold airs having ports perforated substantially over the entire region at the surface of the auxiliary cold air flow channels on the side of the storage chamber;

means disposed within the machine room for controlling the temperature of the circulated cold airs from the storage chamber and supplying them by way of the main cold air flow channels to the inside of the storage chamber; and means disposed within the machine room for pressurizing the circulated cold airs from the storage chamber and supplying them by way of the auxiliary cold air flow channels to the inside of the storage chamber.

In the transportation container according to this invention, the temperature control for the perishable foods loaded within the storage chamber is carried out by the auxiliary recycling cold air flows that flow passing through the auxiliary cold air flow channels and then through the spaces between the cargoes as well as by the temperature control by the main recycling cold air flows circulated through the main cold air flow channels in the same way as usual. The auxiliary recycling cold air flows pass through the gaps between each of the perishable foods and prevail in every corner and nook thereof, the temperature can be controlled efficiently as far as the central region of the cargoes of perishable foods. Accordingly, the temperature inside the storage chamber can uniformly be maintained and, in the case of the cargoes of vegetables and fruits that evaporate the after-ripening ingredients, ventilation of the ingredients can be promoted.

Other objects, features, and characteristics of the present invention, as well as the methods and operations in functions of the related elements of the structure, and to the combination of parts in economies of manufacture, will become apparent upon consideration of the following description and the appended claims with reference to the accompanying drawings, all of which form a part of this specification, wherein like reference numerals designate corresponding parts in the various figures.

BRIEF DESCRIPTION OF THE ACCOMPANYING DRAWINGS

These and other features, as well as the advantageous effects of this invention will become apparent by reading the following descriptions referring to the appended drawings, wherein FIG. 1 is a transverse cross sectional view for a transportation container as one embodiment according to this invention;

DETAILED DESCRIPTION OF PREFERRED EMBODIMENTS

Figure 1:
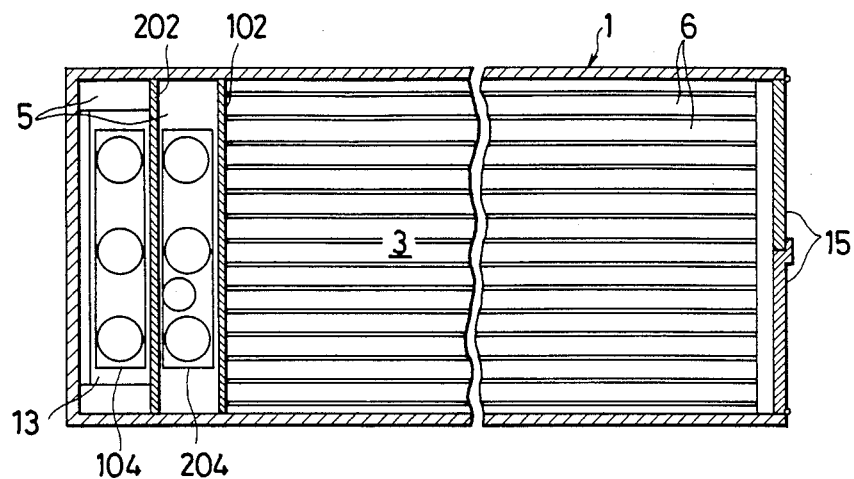

FIGS. 1 through 5 show a transportation container as a preferred embodiment according to this invention.

In the transportation container, the forward portion of a container main body 1 is partitioned by means of partition walls 102 and 202 into a storage chamber 3 for containing perishable foods such as vegetables and fruits and a machine room 5 for containing cooling means comprising a main cooler unit 104 and an auxiliary cooler unit 204, and the rearward portion of the main body 1 is closed by a french door 15.

Figure 4:
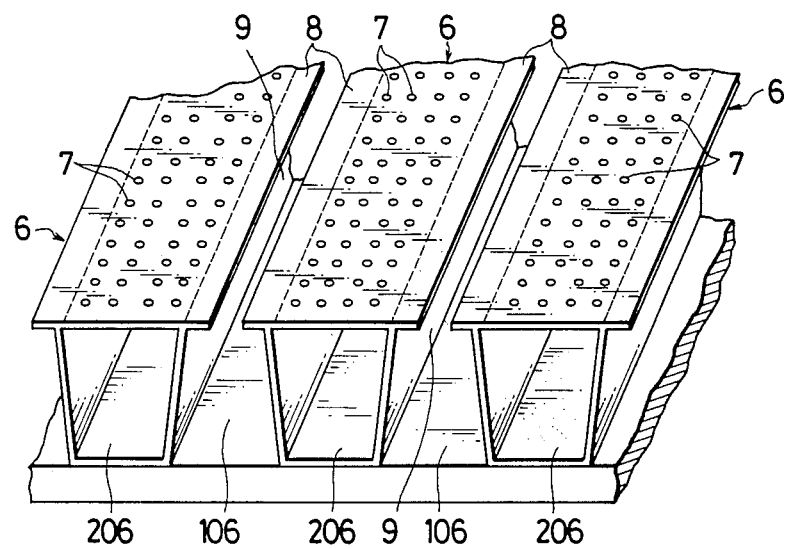
FIG. 4 is a fragmentary perspective view illustrating ventilation ducts constituting main cold air flow channels and auxiliary cold air flow channels.
Figure 5:
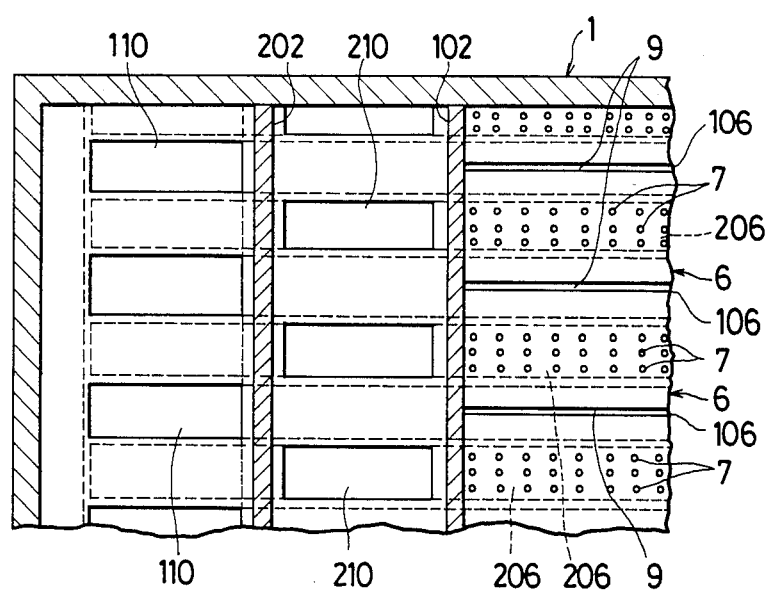
FIG. 5 is a cross sectional view taken along line V—V in FIG. 2 and, FIGS. 6 through 8 are, respectively, explanatory views for the modified embodiments of the main cold air flow channels and auxiliary cold air flow channels.

As shown in FIGS. 4 and 5, a plurality of air ducts 6 each in a reversed trapezoidal cross section are disposed at the bottom of the storage chamber 3 spaced apart from each other by a predetermined gap, and they are closed at the final end and extended at the beginning end thereof passing through the lower end of the partition walls 102 and 202 into the machine room 5.

Each of the air ducts 6 is perforated at the upper wall thereof with cold air blowing ports 7 comprising a plurality of small apertures to define auxiliary cold air flow channels 206 for guiding the auxiliary recycling cold air flows from the auxiliary cold air blowing unit 204. Each of protrusions 8 disposed at the upper ends on both sides of the air duct 6 constitutes, in combination with each of protrusions 8 from the adjacent air duct 6, a main cold air flow channel 106 opened at the final end for guiding the main recycling cold air flow from the main cooler unit 104.

In this embodiment, each of the protrusions 8 of adjacent air ducts 6 define therebetween a slit 9 above the main cold air flow channel 106 such that cold air is caused to partially flow upwardly through the gaps of cargoes in the storage chamber 3 to enable cooling for the cargoes.

Further, as shown in FIG. 5, cold air introducing ports 110 and 210 are formed at the beginning ends for the respective air ducts 6 passing below the lower ends of the partition walls 102 and 202 and extended into the machine room 5 in this embodiment, so that the cold air from the main cooling unit 104 is introduced from the cold air introducing port 110 opened between the partition wall 202 and the front wall of the container main body 1 to the inside of the main cold air flow channels 106, while the cold air from the auxiliary cold air blowing unit 204 is introduced from the cold air introducing port 210 opened between the partition walls 102 and 202 to the inside of the auxiliary cold air flow channels 206. Those portions corresponding to the slits 9 are closed at the cold air introducing port 210.

Figure 2:
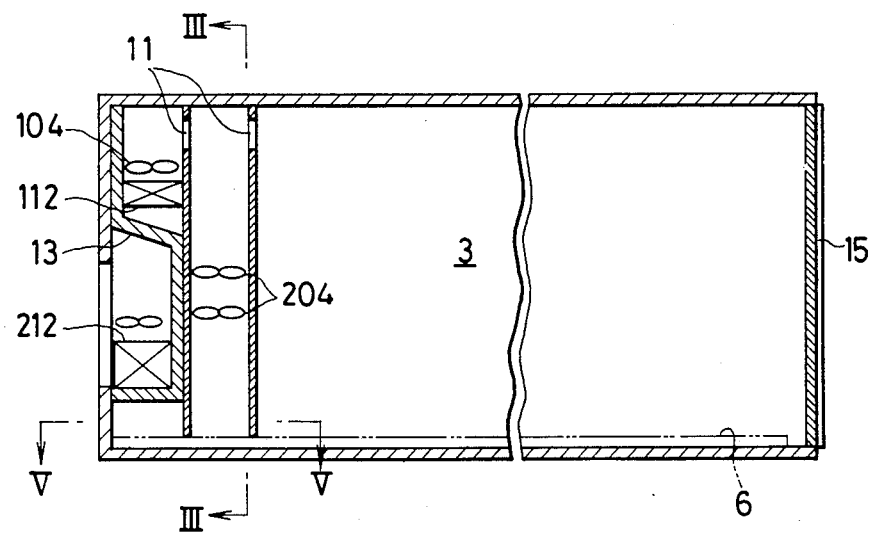
FIG. 2 is a transverse cross sectional view of FIG. 1.
Figure 3:
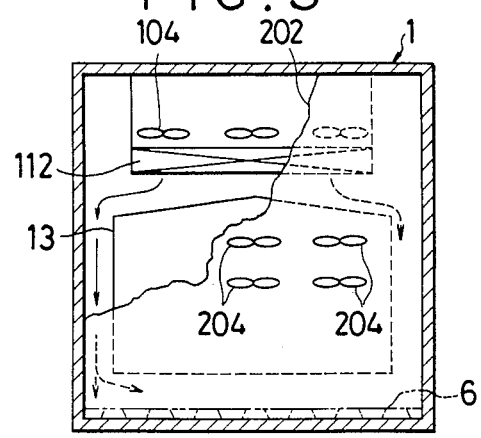
FIG. 3 is a cross sectional view taken along line III—III in FIG. 2.

Further, as shown in FIGS. 1 through 3, introducing ports 11 for introducing the cold air circulated from the inside of the storage chamber 3 into the machine room 5 are opened at the upper portions of the respective partition walls 102 and 202 that partition the storage chamber 3 and the machine room 5 in this embodiment. Further, the auxiliary cold air blowing unit 204 has a pressurizing blower capable of providing an increased pressure so as to feed the auxiliary recycling cold air flows under pressure to the inside of the auxiliary cold air flow channels 206.

The auxiliary cold air blowing unit 204 has no particular temperature conditioning function but merely acts to recycle the circulated cold air from the inside of the storage chamber 3 under pressure, but the main cooler unit 104 has an evaporation unit 112 and a condensation unit 212 thermally partitioned by a partitioning wall 13 as shown in FIGS. 2 and 3, so that the temperature of the cold air circulated from the inside of the storage chamber 3 can be controlled.

OPERATION

The operation of the embodiment having thus been constituted will now be explained.

In the transportation container of this embodiment, the main recycling cold air flow from the main cooler unit 104 is entered from the cold air introducing port 110 to the inside of the main cold air flow channels 106 and guided toward the door 15 of the container main body 1 depending on the situations of the cargoes within the storage chamber 3, rise up from the final end of the main cold air flow channels 106 or through the slits 9 opened at the upper portion thereof to the space inside the storage chamber 3 and are then circulated from each of the introducing ports 11 formed at the upper portion of the respective partition walls 102, 202 to the main cooler unit 104 or to the auxiliary cold air blowing unit 204 in the machine room 5. Further, the auxiliary recycling cold air flow from the auxiliary cold air blowing unit 204 are entered from the cold air introducing ports 210 to the inside of the auxiliary cold air flow channels 206, blow upwardly through the cold air blowing ports 7 opened at the upper wall thereof, enter into the gaps between the cargoes in the storage chamber 3, rise up while cooling the cargoes and are then circulated from each of the introducing ports 11 to the main cooler unit 104 or the auxiliary cold air blowing unit 204 in the machine room 5.

The temperature within the storage chamber 3 can thus be made uniform and, in the case where the cargoes are vegetables and the fruits that evaporate after-ripening ingredients such as ethylene or aldehydes, ventilation for the ingredients can be promoted to prevent the reduction in the freshness of the perishable foods.

Further, since the main cold air flow channels 106 and the auxiliary cold air flow channels 206 are disposed being extended longitudinally along the bottom of the storage chamber 3, they can function also as the structural materials for the container main body 1. Furthermore, since both of the flow channels 106 and 206 are disposed at the bottom of the storage chamber 3, it is no more necessary to dispose gaps between the cargoes and the inner walls of the storage chamber 3, by which the effective capacity of the storage chamber 3, as well as facilitate the loading works.

Figure 6:
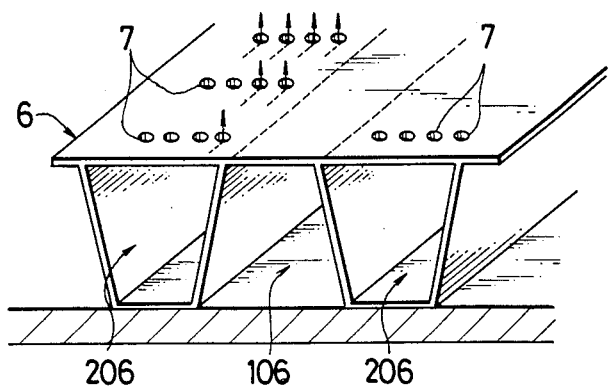
Figure 7:
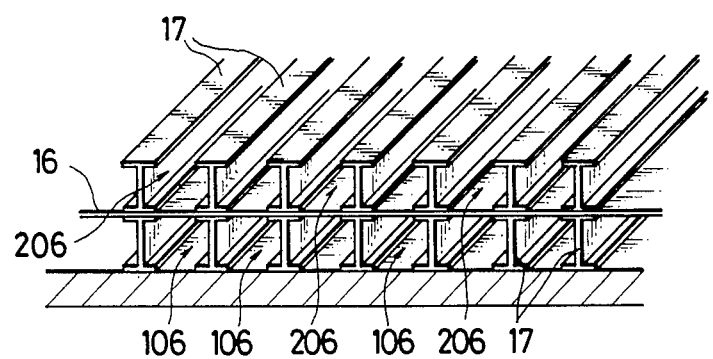
Figure 8:
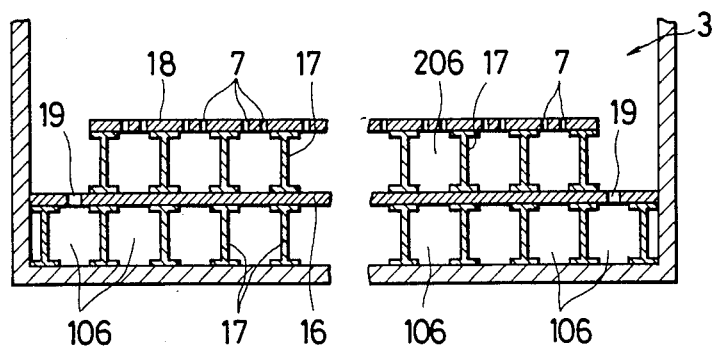

The main cold air flow channels 106 are disposed for guiding the temperature-controlled cold air in the storage chamber 3 from the main cooler unit 104 as far as the door 15, which is most remote from the machine room 5, and then blowing out for the most efficient utilization. Accordingly, although the slits 9 are formed above the main cold air flow channels 106 in the illustrated embodiment, they may alternatively be constituted without using such slits 9, for example, as shown in FIG. 6 such that all of the main recycling cold air flows flowing through the main cold air flow channels 106 are guided near the door 15 of the container main body 1. Further, although the main cold air flow channels 6 and the auxiliary cold air flow channels 206 are alternately arranged in the lateral direction of the bottom of the storage chamber 3 in the illustrated embodiment, they may alternatively be constituted, for example, as shown in FIG. 7 such that a plurality of channel members 17 are stacked in two stages by means of partition plates 16 to define the main cold air flow channels 106 in the lower stage and the auxiliary cold air flow channels 206 each having cold air blowing port 7 opened as a slit at the top thereof in the upper stage. Furthermore, it may also be adapted such that a plurality of channel members 17 are stacked in two stages by means of partition plates 16 in which perforated plates 18 having cold air blowing ports 7 as small apertures are disposed to define the main cold air flow channels 106 in the lower stage and the auxiliary cold air flow channels 206 in the upper stage, as well as that the main cold air blowing ports 19 in the form of apertures or slits are disposed at the upper surface of each of the main cold air flow channels 106 situating both on the lateral ends at the bottom of the storage chamber 3. In this structure, the inner surface at the bottom of the storage chamber 3 is covered with the main cold airs flowing through the cold air flow channels 106, the inner surface of the door 15 and the inner surface of the top wall of the storage chamber 3 are covered with the main recycling cold air flows blown out from the final end of the main cold air flow channels 106 and circulated through the inside of the storage chamber 3, and the inner surfaces on both lateral walls of the storage chamber 3 is covered with the main cold air flows blown out from the main cold air blowing port 19 and uprise along both of the side wall surfaces. Accordingly, the heat insulating effect for the storage chamber 3 can be improved and the temperature within the storage chamber can be controlled more uniformly if the atmospheric temperature varies remarkably.

Further, although the cold air blowing ports 7 formed at the upper surface of the auxiliary cold air flow channels 206 comprise a plurality of small aperture in the foregoing embodiment, they may be replaced with discrete or indiscrete slits in the longitudinal direction, for example, as shown in FIG. 7, provided that the cold air can be blown upwardly substantially over the entire region in the longitudinal direction of the auxiliary cold air flow channels 206.

Furthermore, there are no particular restrictions for the configuration of the main cold air flow channels 106 and the auxiliary cold air flow channels 206. However, since the packaging cases for the perishable foods are loaded on these channels, they may preferably in such a configuration as is convenient to the loading work and having a large area of contact with the packaging cases so as to enable stable loading while preventing the loaded packaging cases from breaking loose. Further, the packaging cases may preferably be perforated so that the cold air can intrude as far as the inside thereof to control the temperature of the perishable foods and the after-ripening ingredients may be expelled efficiently in the case where the perishable foods are vegetables and fruits that discharge the after-ripening ingredients such as ethylene or aldehydes.

Further, although the auxiliary cold air blowing unit 204 in the illustrated embodiments is adapted only to recycle the cold air flows under pressure from the inside of the storage chamber 3 but has no temperature controlling function, it may be provided with a temperature controlling function by additionally disposing a cooler unit or by partially introducing the cold airs from the main cooler unit 104.

Furthermore, although both of the main cold air flow channels 106 and the auxiliary cold air flow channels 206 are disposed at the bottom of the storage chamber 3 in the illustrated embodiments, they may alternately be disposed to the ceiling or on one side of the storage chamber 3 provided that both of the flow channels 106 and 206 are situated on an identical plane and the main recycling cold air flows and the auxiliary recycling cold air flows are circulated to an identical direction.

Furthermore, although no particular explanations have been made in the illustrated embodiments, in the case where the perishable foods loaded within the storage chamber 3 are vegetables and fruits that evaporize the after-ripening ingredients such as ethylene or aldehydes, it is also possible to dispose a layer of a freshness reserving agent that absorbs, adsorbs or decomposes these after-ripening ingredients to the recycling channel of the cold air, preferably, to the recycling channel of the cold air flows in which the main recycling cold air flows and the auxiliary recycling cold air flows are joined and returned from the storage chamber 3 to the machine room 5, whereby the concentration of the after-ripening ingredients can be reduced and the freshness of the vegetables and fruits can be maintained. The layer of the freshness preserving agent used in this case may, for example, be an active alumina layer for the moisture content and an activated carbon layer for ethylene.

As has been described above, according to this invention, the temperature in the storage chamber can be made uniform by the main recycling cold air flows circulated from the main cold air flow channels to the inside of the storage chamber and by the auxiliary recycling cold air flows circulated from the auxiliary cold air flow channels to the inside of the storage chamber to eliminate the temperature slope in the cargoes within the storage chamber from the periphery to the center thereof and, accordingly, no partial degradation is resulted to the freshness. In addition, since the cold air is introduced into every corner of the cargoes, ventilation for the after-ripening ingredients can be promoted to efficiently prevent the degradation of the freshness in the case of cargoes comprising vegetable and fruits that evaporize the after-ripening ingredients. In addition, since the temperature inside the storage chamber can be unified, the power of the cooler unit can be reduced by so much. Furthermore, since the main recycling cold air flows and the auxiliary recycling cold air flows are circulated in an identical direction, it is no more necessary to dispose additional gaps between the cargoes and the inner walls of the storage chamber, by which the effective containing capacity and the efficiency of the loading work can be improved.

Although this invention has been described specifically while referring to most preferred embodiments thereof, they may be modified with respect to detailed structures and the combination and arrangement of parts may variously be changed without departing the spirit and the scope of this invention claimed hereinafter.

While the invention has been described in connection with what is presently considered to be the most practical and preferred embodiment, it is to be understood that the invention is not limited to the disclosed embodiment, but, on the contrary it is intended to cover various modifications and equivalent arrangements included within the spirit and scope of the appended claims.

What is claimed is:

1. A container for use in the transportation of perishable foods comprising:
   a storage chamber for containing perishable foods and having a door therein and a machine room divided from each other by partition walls;
   main cold air flow channels opened at one end on the side of said door and auxiliary cold air flow channels closed at the end on the side of said door, both of which are respectively disposed on the surface of at least one of the bottom wall, top wall or one side wall of said storage chamber;
   means for flowing cold air having ports perforated substantially over the entire region at the surface of said auxiliary cold air flow channels on the side of said storage chamber;
   means disposed within said machine room for controlling the temperature of the circulated cold air from said storage chamber and then supplying the air by way of the main cold air flow channels to the inside of said storage chamber; and
   means disposed within said machine room for pressurizing the circulated cold air from said storage chamber, to a pressure higher than that of said cold air circulated through said main cold air flow channels, and then supplying the air at higher pressure by way of the auxiliary cold air flow channels to the inside of said storage chamber.

2. A container for use in the transportation of perishable foods as defined in claim 1, wherein the main cold air flow channels and the auxiliary cold air flow channels are disposed alternately along the lateral direction of said flow channels.

3. A container for for use in the transportation of perishable foods as defined in in claim 1 or 2, wherein the cold air blowing ports of the auxiliary cold air flow channels comprise a plurality of small apertures.

4. A container for use in the transportation of perishable foods as defined in claim 1, wherein the means for pressurization includes means for controlling the temperature of the recycled cold airs from the storage chamber.

5. The container for use in the transportation of perishable foods as defined in claim 1, wherein a layer of a freshness reserving agent that absorbs, adsorbs or decomposes the after-ripening ingredients is disposed to the flow channels of the recycling cold air flows in the machine room from the storage chamber.

6. A container for use in transporting perishable food, comprising:
   means defining a container for containing perishable food;
   partition means within said container for dividing said container into a storage chamber and a machine room;
   means defining a plurality of main cold air flow channels on a side wall of said container defining means, including slit means communicating said channels with said storage chamber;
   means defining a plurality of auxiliary cold air flow channels on a side wall of said container defining means, said auxiliary channel defining means including means defining a plurality of cold air blowing ports communicating each of said auxiliary channels with said storage chamber;
   means disposed within said machine room for controlling the temperature of and for supplying air to said main cold air flow channels at a first pressure; and
   means disposed within said machine room for pressurizing air from said storage chamber to a second pressure higher than said first pressure and for supplying the air at the second pressure to the auxiliary cold air flow channels.

7. Apparatus according to claim 6, wherein the main cold air flow channels and the auxiliary cold air flow channels are disposed alternately along the lateral direction of the said flow channels.

8. Apparatus according to claim 6 or 7, wherein the cold air blowing ports of the means defining the auxiliary cold air flow channels comprise a plurality of small apertures.

9. Apparatus according to claim 6, wherein said pressurization means includes means for controlling the temperature of the recycled cold air from the storage chamber.

* * * * *